Patented Jan. 23, 1951

2,538,765

UNITED STATES PATENT OFFICE 2,538,765

DIACYL PHENYLPROPANEAMINODIOLS

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,175

6 Claims. (Cl. 260—490)

This application is a continuation-in-part of our copending application Serial No. 15,264, now U. S. Patent 2,483,884, filed March 16, 1948, and the invention relates to new chemical compounds and to chemical methods useful for their synthesis. More particularly, the invention relates to a new class of polyacylated amino diols and to methods for obtaining these products. The polyacylated amino diols of the invention can be represented by the formula,

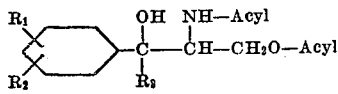

where $R_1$ and $R_2$ are the same or different and represent hydrogen, halogen, lower alkyl or lower alkoxy radicals and $R_3$ is hydrogen or a lower alkyl radical. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like.

It will be appreciated by those skilled in the art that the products and starting materials of the invention can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" (reg.) series or form and to the trans diastereoisomers as the "pseudo" ($\psi$) series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racements of the optically active dextro (d) and levo (l) rotatory isomers as well as in the form of the individual or separated dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula that the formula should be interpreted in its generic sense, that is, as representing the (l)-$\psi$, (d)-$\psi$, (l)-reg. or (d)-reg. isomers in separated form as well as the (dl)-$\psi$ or (dl)-reg. optical racemates or the total unresolved mixture of structural and optical isomers. Such a formula does not merely represent the unresolved mixture of isomers.

In accordance with the invention polyacylated amino diols of the above general formula are produced by acylating a compound of the formula,

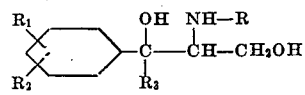

where R is hydrogen or an acyl radical and $R_1$, $R_2$ and $R_3$ have the same significance as given above. As acylating agents acyl anhydrides or halides either alone or in conjunction with alkaline catalysts may be used.

In carrying out the acylation under substantially anhydrous conditions with an acyl anhydride the reaction mixture is heated at about 60 to 135° C. for a short period of time. In most cases the reaction mixture need only be heated for about five to thirty minutes. If desired, the reaction can even be carried out at lower temperatures by allowing the reaction to proceed for a proportionately longer period of time. In general, however, the reaction is preferably carried out at about 70 to 100° C. for about one-half hour.

When an acyl halide is used as the acylating agent under substantially anhydrous conditions and in the absence of a catalyst, the reaction is carried out at a temperature below about 50° C. As a precaution against side reactions it is preferable to only use a slight excess of the acyl halide over that required for reaction with the terminal hydroxyl group and, in the necessary instances, the amino group.

When an alkaline catalyst is used in conjunction with either an acyl halide or anhydride the reaction can be carried out at lower temperatures and within a shorter time. In general, the quantity of acylating agent should not be much in excess of that required to react with the terminal hydroxyl group and, where a free diol is used as the starting material, with the amino group. The preferred temperature for the reaction is in the range of about 20 to 35° C. although the mixture can be heated to as high as 100° C. if desired.

If an alkaline catalyst is employed the acylation can be carried out using an acyl halide in an aqueous medium at a temperature between about 0 and 35° C. As in some of the previously described modifications of the present acylation process it is preferable to only use a slight excess of the acylating agent over the theoretically required amount. When the acyl groups are of a type which are readily hydrolyzed, such as lower aliphatic acyl groups, the alkaline catalyst should be a relatively weak alkaline substance such as barium carbonate, calcium carbonate, magnesium carbonate, sodium acetate or the like. However, where the acyl groups are of a type more resistant to hydrolysis such as benzoyl or substituted benzoyl radicals, strongly alkaline catalysts such as sodium hydroxide and the like may be employed.

Some specific examples of the alkaline materials which can be used in the above described acylation processes are sodium hydroxide, potassium hydroxide, lithium hydroxide, sodium carbonate, potassium carbonate, sodium bicarbonate, sodium acetate, calcium hydroxide, calcium carbonate, barium carbonate, magnesium carbonate, barium hydroxide, pyridine, triethylamine, quinoline, N-ethyl morpholine, N-methyl piperidine and the like.

The products of the invention are valuable intermediates for the preparation of other organic compounds. They are of particular value as intermediates in the preparation of organic compounds possessing antibiotic activity. For example, the products of the invention which have the pseudo structural form and contain no substituents in the phenyl ring can be converted by acylation, nitration, hydrolysis, resolution (if necessary) and mono dichloroacetylation to (l)-ψ-1-p-nitrophenyl-2-dichloroacetamidopropane-1,3-diol, a compound possessing outstanding and unique antibiotic properties.

The invention is illustrated by the following examples:

Example 1

(a) 8 g. of (dl)-ψ-1-phenyl-2-aminopropane-1,3-diol is heated with 20 cc. of acetic anhydride at 70° C. for fifteen minutes. The reaction mixture is evaporated to dryness in vacuo and the residue recrystallized from ethanol. The white crystalline product thus obtained which melts at 168–9° C. is (dl)-ψ-1-phenyl-2-acetamido-3-acetoxypropane-1-ol of formula,

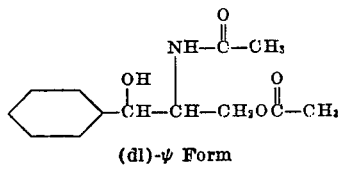

(dl)-ψ Form (b) A mixture consisting of 3 g. of (dl)-ψ-1-phenyl-2-acetamidopropane-1,3-diol and 4 cc. of acetic anhydride is heated for one-half hour on a steam bath. The reaction mixture is evaporated to dryness in vacuo and the residue crystallized from absolute ethanol to obtain the desired (dl)-ψ-1-phenyl-2-acetamido-3-acetoxypropane-1-ol; M. P. 168–9° C.

(c) A solution consisting of 2 g. of (l)-ψ-1-phenyl-2-aminopropane-1,3-diol in 3 cc. of acetic anhydride is heated for thirty minutes at 90–100° C., cooled and the excess anhydride removed by distillation in vacuo below 50° C. Crystallization of the residue from absolute alcohol yields the desired (l)-ψ-1-phenyl-2-acetamido-3-acetoxypropane-1-ol of formula,

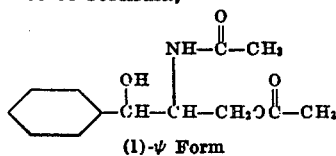

(l)-ψ Form

Example 2

(a) 3.5 g. of benzoyl chloride is added in small portions to a suspension of 3.3 g. of (dl)-ψ-1-phenyl-2-aminopropane-1,3-diol in 25 cc. of 1 N sodium hydroxide solution with shaking. After the odor of benzoyl chloride has disappeared, the solid product is collected and purified by recrystallization from methanol. The product thus obtained is (dl)-ψ-1-phenyl-2-benzamido-3-benzoyloxypropane-1-ol (M. P. 145–6° C.) of formula,

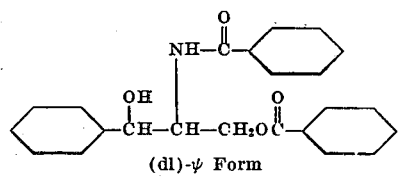

(dl)-ψ Form

By substituting the corresponding (dl) reg. isomer for the (dl)-ψ-isomer used in the above procedure one obtains (dl) reg. 1-phenyl-2-benzamido-3-benzoyloxypropane-1-ol; M. P. 165–6° C.

By substituting 3.9 g. of p-methylbenzoyl chloride for the benzoyl chloride used in the above procedure one obtains (dl)-ψ-1-phenyl-2-p'-methylbenzamido-3-p'-methylbenzoyloxypropane-1-ol. By using 5.1 g. of 3,4-dichlorobenzoyl chloride instead of the benzoyl chloride used in the above procedure one obtains (dl)-ψ-1-phenyl-2-(3',4'-dichlorobenzamido)-3-(3',4'-dichlorobenzoyloxy) propane-1-ol.

Example 3

A mixture consisting of 2 g. of (dl)-ψ-1-phenyl-2-p-nitrobenzamidopropane-1-3-diol and 5 cc. of acetic anhydride is heated on a steam bath for fifteen minutes. The excess acetic anhydride is removed by distillation in vacuo below 50° C. and the residue crystallized from ethanol to obtain the desired (dl)-ψ-1-phenyl-2-p-nitrobenzamido-3-acetoxypropane-1-ol of formula,

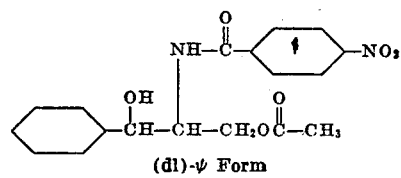

(dl)-ψ Form

Example 4

4 cc. of phenylacetyl chloride is added in small portions to a suspension of 1.67 g. of (dl)-reg.-1-phenyl-2-aminopropane-1,3-diol in 30 cc. of 1 N sodium hydroxide solution. After a short time the precipitated solid is collected and purified for recrystallization from methanol to obtain the desired (dl-reg.-1-phenyl-2-phenylacetamido-3-phenylacetoxypropane-1-ol of formula,

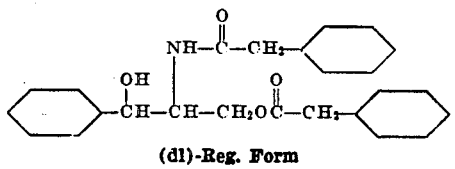

(dl)-Reg. Form

Example 5

A mixture consisting of 1 g. of 1-ψ-1-p-iodophenyl-2-dichloroacetamidopropane - 1 - 3 - diol, 5 cc. of glacial acetic acid and 0.3 g. of acetic anhydride is refluxed for one hour. The reaction mixture is evaporated to dryness in vacuo and the residue crystallized from ethanol to obtain the desired (l)-ψ-1 - p-iodophenyl-2-dichloroacetamido-3-acetoxypropane-1-ol of formula,

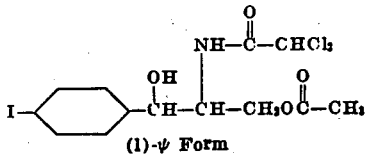

(l)-ψ Form

Example 6

1.55 g. of benzoyl chloride is added to a solution of 2.5 g. of (dl)-reg.-1-o-methylphenyl-2-β,β-dimethylacrylamidopropane-1-3-diol in 5 cc. dry pyridine and the mixture allowed to stand for twenty-four hours. The solution is diluted with 35 cc. of 2 N hydrochloric acid and the (dl)-reg.-1-o-methylphenyl - 2 - β,β - dimethylacrylamido-3-benzoyloxypropane-1-ol collected and purified by recrystallization from methanol. The formula of this product is:

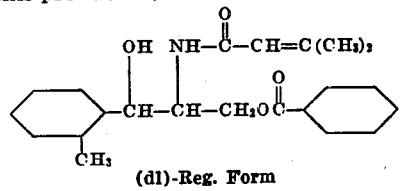

(dl)-Reg. Form

Example 7

A solution consisting of 1.8 g. of (dl)-ψ-3-phenyl-2-aminobutane-1-3-diol and 5 cc. of methoxyacetic anhydride is heated at 90–100° C. for one-half hour. The solution is diluted with 5 volumes of petroleum ether, the solid product collected and recrystallized from ethanol. The product thus obtained is (dl)-ψ-3-phenyl-2-methoxyacetamido - 1 - methoxyacetoxybutane-3-ol of formula,

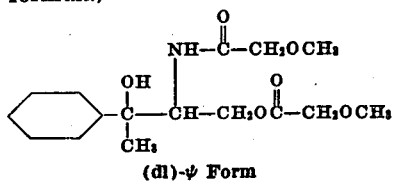

(dl)-ψ Form

Example 8

5 g. of (dl)-ψ-1-o-methylphenyl-2-aminopropane-1-3-diol is heated with 10 g. of acetic anhydride at about 70–80° C. for fifteen minutes. The reaction mixture is evaporated to dryness in vacuo and the residue crystallized from ethanol to obtain the desired (dl)-ψ-1-o-methylphenyl-2-acetamido-3-acetoxypropane-1-ol of formula,

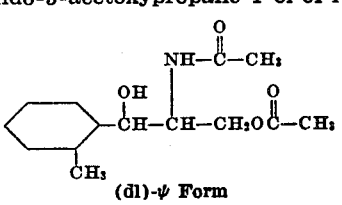

(dl)-ψ Form

Example 9

8 g. of (dl)-ψ-1-m-methoxyphenyl-2-aminopropane-1-3-diol is heated at about 70° C. with 15 g. of acetic anhydride for one-half hour and then the excess acetic anhydride and liquid reaction products removed by distillation in vacuo. The residue which consists of (dl)-ψ-1-m-methoxyphenyl-2-acetamido-3-acetoxypropane-1-ol of formula,

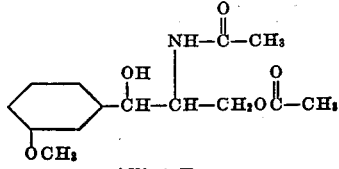

(dl)-ψ Form is taken up in ethanol and purified by recrystallization from this solvent.

Example 10

5 g. of (dl)-ψ-2-amino-3-phenylbutane-1-3-diol is heated at 80° C. for one-half hour with 20 cc. of acetic anhydride and then the reaction mixture evaporated to dryness in vacuo. The residual (dl) - ψ-1-acetoxy-2-acetamido-3-phenylbutane-3-ol is purified by recrystallization from ethanol. The formula of this product is:

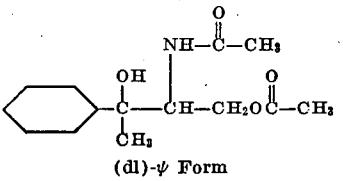

(dl)-ψ Form

Example 11

A mixture consisting of 2 g. of (d)-ψ-1-(3',4'-dimethylphenyl)-2-aminopropane-1-3-diol and 4.4 grams of furoic anhydride in 10 cc. of dry pyridine is heated for one hour on a steam bath. The reaction mixture is diluted with 70 cc. of 2 N hydrochloric acid, the precipitated solid collected and washed with sodium bicarbonate solution and then with water. Recrystallization from ethyl acetate yields the desired 2,3-difuroyl derivative of (d)-ψ-1-(3',4'-dimethylphenyl)-2-aminopropane-1-3-diol of formula, (d)-ψ Form

Example 12

2.2 g. of succinic anhydride is added to a solution of g. of (dl)-reg.-1-o-chlorophenyl-2-aminopropane-1-3-diol in 6 cc. of dry pyridine and the reaction mixture heated on a steam bath for one-half hour. The reaction mixture is diluted with 50 cc. of 2 N hydrochloric acid, the product collected and purified by recrystallization from hot water. The product thus obtained is the 2,3-diacid succinoyl derivative of (dl)-reg.-1-o-chlorophenyl-2-aminopropane-1-3-diol of formula, (dl)-Reg. Form

Example 13

2.3 g. of (dl)-ψ-1-phenyl-2-cyanoacetamidopropane-1-3-diol in 3 cc. of acetic anhydride is heated at 90–100° C. for fifteen minutes. The excess anhydride is removed by distillation in vacuo and the residue crystallized from ethanol to obtain the desired (dl)-ψ-1-phenyl-2-cyanoacetamido-3-acetoxypropane-1-ol. This compound has the formula,

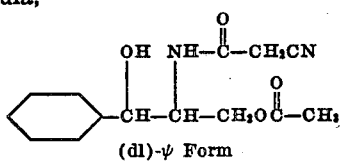

(dl)-ψ Form

Example 14

1.1 cc. of acetic anhydride is added to a solution consisting of 2.5 grams of (l)-reg.-1-phenyl-2-nicotinamidopropane-1-3-diol in 10 cc. ethyl acetate and is allowed to stand for three hours. The reaction mixture is washed with saturated sodium bicarbonate solution and with water and the ethyl acetate layer dried. The ethyl acetate is removed by distillation in vacuo and the residue crystallized from ethanol to obtain the desired (l)-reg.-1-phenyl-2-nicotinamido-3-acetoxypropane-1-ol of formula,

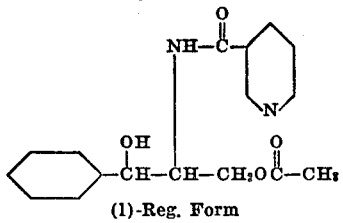

(l)-Reg. Form

Example 15

A mixture consisting of 3 g. of (l)-ψ-3-phenyl-2-lactamidobutane-1-3-diol and 5 cc. of acetic anhydride is heated at 90–100° C. for one-half hour. The reaction mixture is evaporated to dryness in vacuo and the residue crystallized from methanol to obtain the desired (l)-ψ-3-phenyl-2-acetoxylactamido-1-acetoxybutane-3-ol of formula,

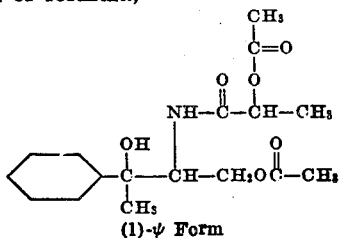

(l)-ψ Form

Example 16

A mixture consisting of 3.5 g. of (dl)-ψ-1-phenyl-2-carbobenzoxylactamidopropane-1-3-diol and 6 cc. of acetic anhydride is heated at 90–100° C. for one-half hour. The reaction mixture is evaporated to dryness in vacuo and the residue crystallized from methanol to obtain (dl)-ψ-1-phenyl-2-carbobenzoxylactamido-3-acetoxypropane-1-ol of formula,

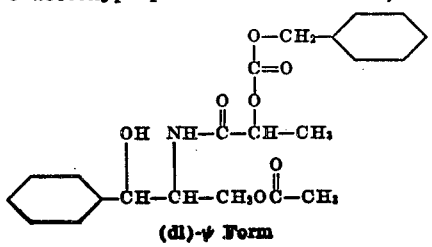

(dl)-ψ Form 2 g. of the carbobenzoxy derivative prepared above are dissolved in 30 cc. glacial acetic acid and reduced catalytically in the presence of paladium oxide. The catalyst is removed by filtration, the filtrate evaporated to dryness in vacuo and the residue crystallized from ethanol to obtain the desired (dl)-ψ-1-phenyl-2-lactamido-3-acetoxypropane-1-ol of formula,

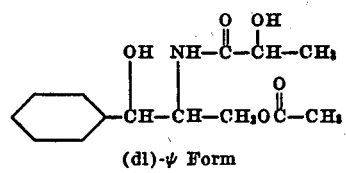

(dl)-ψ Form

Example 17

1.5 g. of phthalic anhydride is added to a solution of 1.67 g. of (dl)-ψ-1-phenyl-2-acid-phthalamidopropane-1,3-diol in 4 cc. of dry pyridine and the mixture heated for one hour on a steam bath. The reaction mixture is diluted with 60 cc. of 1 N hydrochloric acid and the (dl)-ψ-1-phenyl-2-acid-phthalamido-3-acid-phthaloyloxypropane-1-ol which separates collected and recrystallized from aqueous alcohol. The formula of this product is

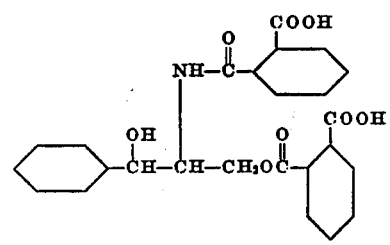

(dl)-ψ Form

Example 18

A suspension of 2.8 grams of (dl)-ψ-1-phenyl-2-dichloroacetamidopropane-1,3-diol in 5 cc. of acetic anhydride is heated on a steam bath for one-half hour. The reaction mixture is evaporated to dryness in vacuo below 50° C. and the residue crystallized from ethanol to obtain the desired (dl)-ψ-1-phenyl-2-dichloroacetamido-3-acetoxypropane-1-ol of formula,

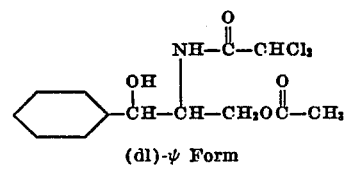

(dl)-ψ Form

In the foregoing examples we have employed a new class of amino diols and their mono acyl derivatives as starting materials. These starting materials can be prepared in a number of different ways. One of the general methods which can be used to prepare these products is that represented by the following diagram:

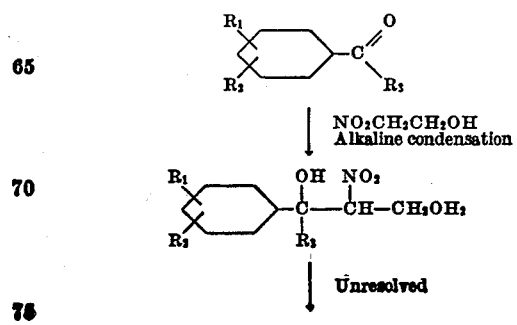

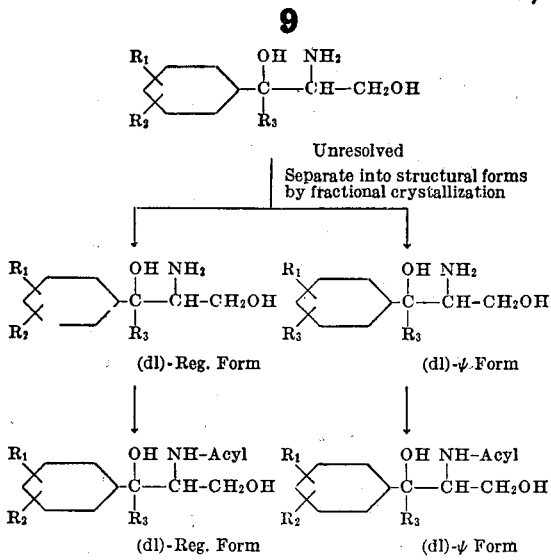

where $R_1$, $R_2$ and $R_3$ have the same significance as given above. Where optically active starting materials are desired, the racemic structural forms of the free amino diol are resolved into their optical isomers via an optically active acid addition salt. Optically active acids suitable for this resolution include d-tartaric or its diacetyl or dibenzoyl derivatives, d-camphorsulfonic, d-bromocamphorsulfonic, mandelic acid and the like. The optically active amino diols so obtained can be used as starting materials per se or converted by acylation, as shown above, to the optically active N-acylamido diol starting materials of the invention.

The following examples serve to illustrate the application of this general method to the preparation of some of the specific starting materials used in the foregoing examples.

*Example 19*

1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1-phenyl-2-nitropropane-1,3-diol. If desired, the free nitro-diol having the formula,

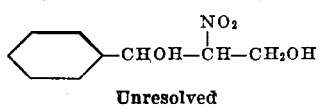

Unresolved can be obtained by acidification of the salt.

20 g. of the sodium salt of 1-phenyl-2-nitropropane-1,3-diol is dissolved in 200 cc. of glacial acetic acid. 0.75 g. of palladium oxide hydrogenation catalyst is added and the mixture shaken with hydrogen under three atmospheres pressure for about twelve hours. The catalyst is removed by filtration, the filtrate concentrated to about one-tenth volume in vacuo and diluted with five volumes of water. The solution is extracted with one volume of ethyl acetate or ether and the extract discarded. The aqueous phase is made alkaline to pH 12 with strong sodium hydroxide solution and extracted with five 100 cc. portions of ethyl acetate. The combined extracts are dried, the ethyl acetate evaporated and the residue recrystallized from chloroform. The white crystalline product thus obtained is (dl)-reg.-1-phenyl-2-aminopropane-1,3-diol (M. P. 103–4° C.) of formula,

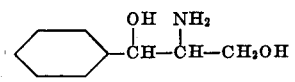

(dl)-Reg. Form

The (dl)-ψ-1-phenyl-2-aminopropane-1,3-diol (M. P. 86–7° C.) can be separated from the chloroform filtrate remaining from the crystallization of the (dl)-reg. isomer by fractional crystallization. Alternatively, the separation of the (dl)-reg. from the (dl)-ψ- structure form can be completed by converting the residue obtained from the chloroform filtrate to the N-acetyl derivative and fractionally crystallizing the product.

2. g. of (dl)-ψ-1-phenyl-2-aminopropane-1,3-diol is heated with 25 cc. of ethyl acetate under reflux for about eight hours. The ethyl acetate is removed by distillation, the residue treated with water and extracted with ethyl acetate. The ethyl acetate extract is washed with dilute hydrochloric acid, sodium bicarbonate solution and then with water. The ethyl acetate solution is dried, the ethyl acetate distilled and the residue crystallized from ethyl acetate to obtain the desired (dl)-ψ-1-phenyl-2-acetamidopropane-1,3-diol (M. P. 136–7° C.) of formula,

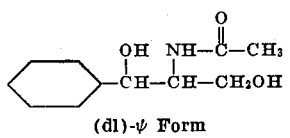

(dl)-ψ Form

By substituting the corresponding (dl)-reg.-amino diol for the (dl)-ψ-amino diol used above, one obtains (dl)-reg.-1-phenyl-2-acetamidopropane-1,3-diol; M. P. 103–4° C.

4 g. of (dl)-ψ-1-phenyl-2-aminopropane-1,3-diol is dissolved in about 60 cc. of warm n-butanol containing an equivalent amount of d-camphorsulfonic acid. The mixture is cooled and the crystalline d-camphorsulfonate salt of 1-ψ-1-phenyl-2-aminopropane-1,3-diol which separates collected. The corresponding d-camphorsulfonate salt of the (d)-ψ-isomer can be recovered, if desired, from the filtrate. The d-camphorsulfonate salt of (l)-ψ-1-phenyl-2-aminopropane-1,3-diol is dissolved in a small amount of water containing an excess of sodium hydroxide. The solution is extracted with ethyl acetate, the ethyl acetate extracts dried and the solvent distilled in vacuo. The residue consists of (l)-ψ-1-phenyl-2-aminopropane-1,3-diol which has the formula,

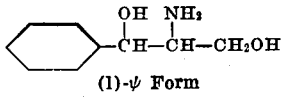

(l)-ψ Form

Treatment of the d-camphorsulfonate salt of (d)-ψ-1-phenyl-2-aminopropane-1,3-diol with excess alkali yields the desired (d)-ψ-isomer of the amino diol.

By substituting (dl)-reg.-1-phenyl-2-aminopropane-1,3-diol for the (dl)-ψ-amino diol used in the above procedure one obtains the (d) and (l)-reg. optical isomers of 1-phenyl-2-aminopropane-1,3-diol.

1 g. of (l)-ψ-1-phenyl-2-aminopropane-1,3-diol is heated with 10 cc. of ethyl acetate under reflux for about ten hours. The ethyl acetate is removed by distillation in vacuo, the residue treated with water, extracted with ethyl acetate and the ethyl acetate extract washed with dilute hydrochloric acid. The ethyl acetate extract is washed with dilute sodium bicarbonate solution, then with water, and dried. Evaporation of the ethyl acetate, followed by crystallization of the residue from ethylene dichloride, yields the desired (l)-ψ-1-phenyl-2-acetamidopropane-1,3-diol of formula,

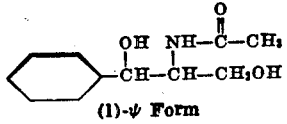

(l)-ψ Form 1.7 g. of (dl)-reg.-1-phenyl-2-aminopropane-1,3-diol is treated with 1.6 g. of methyl dichloroacetate and the mixture heated at 100° C. for one hour and fifteen minutes. The residue is washed with two 20 cc. portions of petroleum ether and the insoluble product collected. Recrystallization from ethyl acetate yields the desired (dl)-reg.-1-phenyl-2-dichloroacetamidopropane-1,3-diol in pure form; M. P. 158–9° C. This product's formula is:

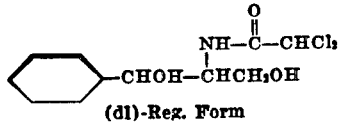

(dl)-Reg. Form

*Example 20*

2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the white insoluble sodium salt of 1-o-methylphenyl-2-nitropropane-1,3-diol removed by filtration, washed with ether and dried. Acidification of this sodium salt produces the corresponding free nitro compound, 1-o-methylphenyl-2-nitropropane-1,3-diol, which has the formula,

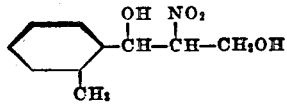

Unresolved 18 g. of the sodium salt of the 1-o-methylphenyl-2-nitropropane-1,3-diol is dissolved in 175 cc. of glacial acetic acid. 0.75 g. of palladium oxide hydrogenation catalyst added and the mixture hydrogenated under three atmospheres pressure of hydrogen for about twelve hours. The catalyst is removed by filtration, the filtrate concentrated to a small volume in vacuo and then the residue diluted with five volumes of water. The solution is extracted with one volume of ethyl acetate or ether and the extract discarded. The aqueous phase is made alkaline to pH 12 with strong sodium hydroxide solution and extracted with five volumes of ethyl acetate. The ethyl acetate extracts are combined, dried and the ethyl acetate evaporated in vacuo. The residue which consists of a mixture of the (dl)-reg. and (dl)-ψ-1-o-methylphenyl-2-aminopropane-1,3-diol is taken up in and crystallized from chloroform to obtain the (dl)-reg.-1-o-methylphenyl-2-aminopropane-1,3-diol in crystalline form. Its formula is:

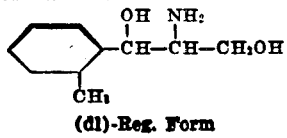

(dl)-Reg. Form

The chloroform filtrate from which the (dl)-reg.-1-o-methylphenyl-2-aminopropane-1,3-diol has been removed is evaporated in vacuo to obtain the crude (dl)-ψ-1-o-methylphenyl-2-aminopropane-1,3-diol.

The crude (dl)-ψ-1-o-methylphenyl-2-aminopropane-1,3-diol is treated with an excess of acetyl chloride at about room temperature in a solvent of dry benzene. When a considerable amount of the hydrochloride salt of (dl)-ψ-1-o-methylphenyl-2-aminopropane-1,3-diol has separated from the solution the reaction is stopped by the addition of 300 cc. of water. After thorough mixing the aqueous solution is removed and saved for recovery of the unacetylated amino diol. The benzene solution is washed with dilute sodium bicarbonate solution and then dried. The benzene is removed by distillation in vacuo and the crude (dl)-ψ-1-o-methylphenyl-2-acetamidopropane-1,3-diol taken up in alcohol and purified by recrystallization from alcohol. The formula of this product is:

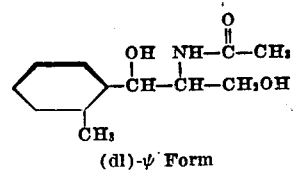

(dl)-ψ Form 1.8 grams of (dl)-ψ-1-o-methylphenyl-2-amino-propane-1,3-diol is heated with 4 cc. of methyl benzoate in 30 cc. of absolute methanol containing 1 cc. of 1 N sodium methoxide. After one hour the reaction mixture is neutralized with 1 cc. of 1 N hydrochloric acid and evaporated to dryness in vacuo. Crystallization of the residue from hot water yields the desired (dl)-ψ-1-o-methylphenyl-2-benzamidopropane-1,3-diol of formula,

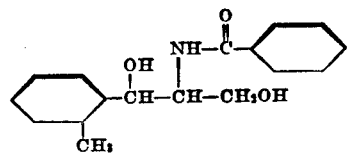

*Example 21*

The starting materials having as the root of their formulae the structure,

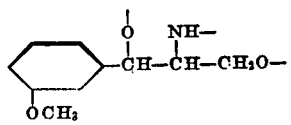

can be obtained by starting with m-methoxybenzaldehyde and β-nitroethanol and applying the procedures described in Examples 19 and 20.

*Example 22*

The starting materials which have as the root of their formulae the structure,

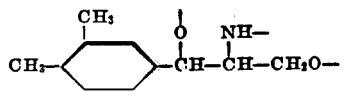

can be prepared by starting with 3,4-dimethylbenzaldehyde and β-nitroethanol and following the procedures described in Examples 19 and 20.

*Example 23*

The compounds used as starting materials in the preparation of the products having as the root of the formulae the structure,

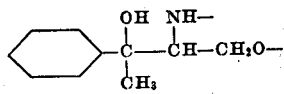

are prepared by starting with acetophenone and β-nitroethanol and following the procedures described in Examples 19 and 20.

*Example 24*

The products used as starting materials having as the root of their formulae the structure,

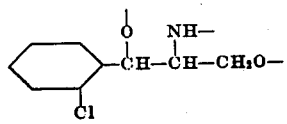

can be prepared from o-chlorobenzaldehyde and β-nitroethanol using the procedures described in Examples 19 and 20. However, the reduction of the 1-o-chlorophenyl-2-nitropropane-1,3-diol intermediate is preferably carried out by the use of stannous chloride or acetate in acetic acid rather than by the use of the catalytic means shown in the aforementioned examples.

Some of the subject matter disclosed but not claimed herein, is disclosed and claimed in our copending applications filed on even date herewith, Serial Nos. 76,172, 76,173, 76,174, 76,176, 76,177 (now Patent No. 2,514,376), 76,178 (now Patent No. 2,514,377), 76,179 (now Patent No. 2,483,885), and 76,180.

What we claim is:
1. A compound of the formula,

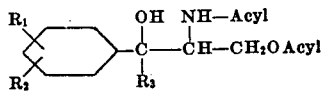

where $R_1$ and $R_2$ are members of the class consisting of hydrogen, halogen, lower alkyl and lower alkoxy radicals and $R_3$ is a member of the class consisting of hydrogen and lower alkyl radicals; said acyl being a carboxylic acid acyl radical.

2. A compound of the formula,

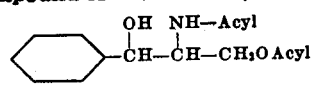

said acyl being a carboxylic acid acyl radical.

3. A compound of the formula,

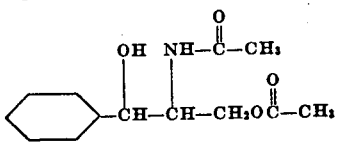

4. A compound of the formula,

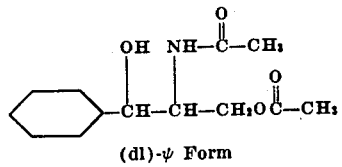

(dl)-ψ Form

5. A compound of the formula,

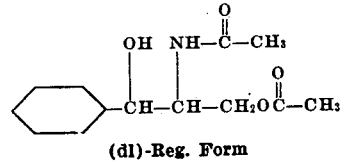

(dl)-Reg. Form

6. A compound of the formula,

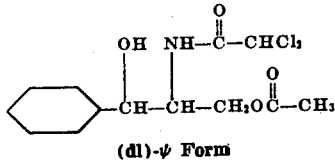

(dl)-ψ Form

HARRY M. CROOKS, JR.
MILDRED C. REBSTOCK.
JOHN CONTROULIS.
QUENTIN R. BARTZ.

REFERENCES CITED

The following references are of record in the file of this patent:

UNITED STATES PATENTS

| Number | Name | Date |
|---|---|---|
| 2,103,266 | Lott | Dec. 28, 1937 |